Feb. 7, 1928.
M. B. SKINNER
VALVE RESEATING TOOL
Filed July 23, 1923
1,658,141
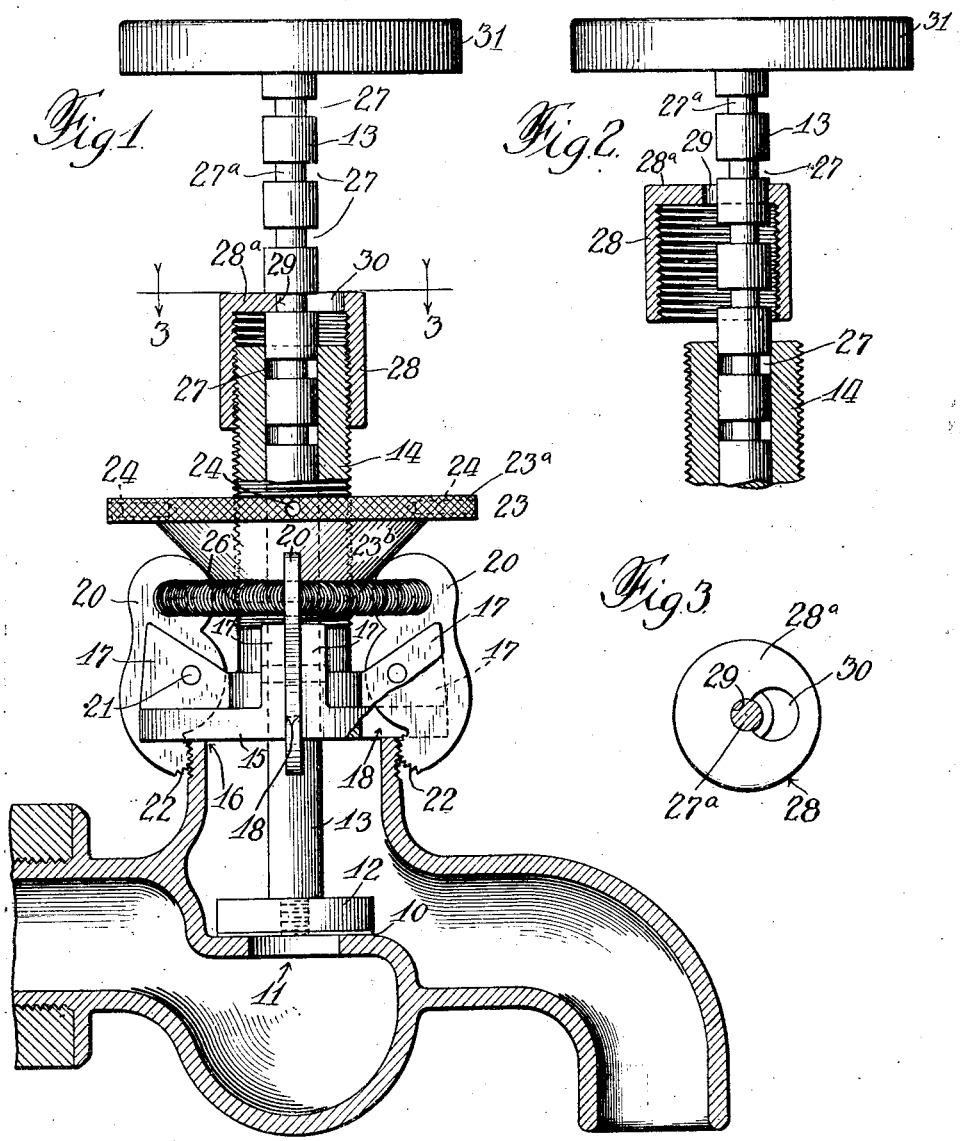

Patented Feb. 7, 1928.

1,658,141

UNITED STATES PATENT OFFICE.

MORTIMER B. SKINNER, OF WILMETTE, ILLINOIS.

VALVE-RESEATING TOOL.

Application filed July 23, 1923. Serial No. 653,245.

My present invention relates to tools for resurfacing the seats of valves, such as faucets, cocks, globe valves, etc., in which there is an opening for a valve stem and connections in lines leading directly to the seat.

The chief object of the present improvements is to provide a simple, cheap, sturdy and durable tool of the character described, which may be readily and unusually strongly secured in its operative position, and according to which the operator may easily and rapidly resurface the valve seat by a hand operation, and to provide such advantages in a tool having provisions of adjustment for use on valves of various sizes throughout a wide range. Other objects and advantages will appear hereinafter.

In the accompanying drawings, which form a part of this specification, Figure 1 is a medial vertical section of a conventional form of valve and of parts of the reseating tool operatively in association therewith, some parts being broken away and other parts being shown in full; Fig. 2 is a sectional view of the upper parts of Fig. 1 showing the use of the rough-adjustment feature; and Fig. 3 is a cross sectional view on the line 3—3 of Fig. 1.

My improved tool is shown in position for resurfacing the valve seat on the partition wall 10 about the discharge opening 11 of the valve body. The cutter 12 threaded on the shaft 13 may be of any approved form.

The operating or cutter shaft 13 extends axially through a main support which includes a cylindrical part or body 14 which is exteriorly threaded and which terminates in a disc-like integral base part or member 15, the bottom of which is surfaced at right angles to the axis of the cylindrical part 14 so as to rest flat upon the upper annular edge of the valve body at 16 defining the opening through which the valve stem and its connections extend when the valve parts are normally assembled. This base 15 has four upwardly and outwardly extending lugs 17, each thereof being bifurcated, as by milling a slot 18 on radial lines into the lugs respectively, these slots 18 being provided respectively for the accommodation of clamping lever or jaw members 20 pivotally mounted on pins 21 for rocking movement. The lower ends of these jaw members extend below the base 15 and are provided with gripping teeth at 22, preferably arranged on an arcuate surface, which teeth at 22 are adapted to engage screw threads on the outer periphery of the valve body as shown, or, in the absence of such threads the teeth 22 will engage whatever annular surface is presented to them, and thus hold the resurfacing tool firmly and securely upon the valve body.

A hand-operable wedging member 23 is threaded upon the cylindrical body part 14. It preferably has a relatively large disc-like hand-grasp part 23$^a$ which is provided with radial holes 24 into which respectively a pin may be inserted for better leverage. The wedging member 23 has also a conical part 23$^b$ which engages the upper rounded surfaces respectively of the clamping levers or dogs 20. The coiled spring 26 passing through holes in the levers 20 maintains the upper end portions of these levers in engagement with the conical surface 23$^b$ whereby the jaws at 22 are constantly maintained uniformly spread apart or open for ready application of the tool to the valve. The dogs 20 are levers of the first class and it is apparent that by advancing the wedging member 23 in a direction toward the dogs the upper ends of the dogs or clamps are spread apart uniformly and that the lower ends at 22 are moved inward, or toward the axial line of the tool, whereby the desired clamping and gripping effect is had.

The shaft 13 is provided with a plurality of recesses 27 of such width as to accommodate a stop element carried by the fine-adjustment nut or sleeve 28, this sleeve 28 is shown as having a cross wall 28$^a$ at its upper end having a central opening 29 which opens into a laterally positioned opening 30 sufficiently large to accommodate for sliding movement the shaft 13, the opening 29 being considerably smaller, but large enough to accommodate the reduced diameter of the shaft at 27$^a$ resulting from the construction of the slots 27. Fig. 2 shows the sleeve or feed element 28 as having been unthreaded from the cylindrical stem 14, the shaft 13 moved up slightly and the feed member 28 thereupon moved laterally to bring the larger hole 30 concentric with the shaft 13. It is apparent that in this position of the parts the feed member or sleeve 28 may be moved on the shaft 13, and that having been moved it may be brought back into its concentric position with the walls of the opening 29 of the sleeve engaging the shaft at some other reduced diameter 27$^a$. The sleeve may then be again threaded upon the body 14, and, according to the rough adjustment thus made, the cutter 12 will be at a materially greater or lesser distance from the base 15 than it was before. The seat to be resurfaced is at various depths in the valve according to the size or character of the valve, and by means of the rough adjustment thus provided the cutter can readily be brought fairly close to the seat throughout a wide range of such distance.

When the resurfacing operation is actually under way the cutter, as 12, is brought into engagement with the seat to be resurfaced, through the advancing movements of the feed member 28 threaded upon the body 14. Its downward movement relative to the body carries the shaft 13 with it and consequently carries the cutter as 12 into engagement with the work. The operator turns the shaft and cutter by means of the hand wheel 31 and gradually and by small degrees advances the cutter until the surfacing operation has been performed.

When it is desired to remove the tool from the valve it is merely necessary to retract the clamping device 23 sufficiently to release the jaws at 22, and then simply lift the tool away.

It may be noted that the shaft 13 fits nicely from end to end of the body 14 and the base part 15, and is therefore maintained accurately in its desired true axial position with respect to the main support during the cutting operation. The provision of a considerable number of clamping members, preferably four, makes for an unusual strength of grip and holding effect, and the arrangement also provides that the tool becomes automatically centered with respect to the valve seat. Since the base 15 rests upon a surface of the valve which was turned or trued at its upper end and also at its sides about the valve stem opening at the same time the valve seat was originally surfaced it is clear that through the use of this tool an accurate resurfacing of the seat may be accomplished. The tool is unusually simple of operation and easy of application to and removal from the work and the actual cutting operation is rendered simple and easy through both the coarse and fine adjustments provided, and through the fact that the tool is held so rigidly and securely upon the work.

The construction is such also that the base as 15 need not rest upon a valve part, or rest flat thereon, but in certain uses the operator could otherwise determine the proper position of the tool and could clamp it securely by the means shown.

I contemplate as being included in these improvements, such modifications of and departures from what is specifically herein illustrated and described as fall within the scope of the appended claims.

I claim:

1. In a valve reseating tool of the character described, clamping means comprising in combination a unitary main support including a base adapted to rest upon a valve about the valve stem opening thereof, a cutter shaft guided in an axial opening in the support, a plurality of clamping levers of the first class pivotally mounted on the main support and having clamping portions respectively extending below the main support, and means for simultaneously moving the upper portions of said clamping levers outwardly to move the lower portions thereof inwardly into engagement with the exterior of the valve part about the valve stem opening thereof.

2. In a valve reseating tool of the character described, the combination of a main support, means for holding the main support upon a valve body, a cutter-operating shaft rotatably mounted in and extending through said main support, said shaft having a plurality of annular recesses therein, said main support having its upper portion screw threaded, a threaded sleeve having a cross wall on said threaded portion, said cross wall having a lateral opening large enough to accommodate loosely said shaft and having a central opening merging into said lateral opening and providing yoke-like stop portion adapted to extend into any one of said recesses and to be withdrawn readily therefrom whereby the shaft is moved adjustably when said sleeve is turned on the threaded portion, the engagement of said stop element with the shaft in any of said recesses being such that when said sleeve is unthreaded from the main support said stop element may be removed out of engagement with one of said recesses and by moving the sleeve relative to the shaft with the shaft in said lateral opening said stop element may be positioned in another thereof and the sleeve thereupon threaded back upon the main support.

MORTIMER B. SKINNER.